United States Patent
Cortez et al.

(10) Patent No.: US 10,066,145 B2
(45) Date of Patent: Sep. 4, 2018

(54) POLYMER BRUSHES IN DIVERTING AGENTS FOR USE IN SUBTERRANEAN FORMATIONS

(71) Applicant: Halliburton Energy Services, Inc., Houston, TX (US)

(72) Inventors: Janette Cortez, Kingwood, TX (US); Corneliu Stanciu, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/326,713

(22) PCT Filed: Aug. 18, 2014

(86) PCT No.: PCT/US2014/051462
§ 371 (c)(1),
(2) Date: Jan. 17, 2017

(87) PCT Pub. No.: WO2016/028256
PCT Pub. Date: Feb. 25, 2016

(65) Prior Publication Data
US 2017/0210965 A1 Jul. 27, 2017

(51) Int. Cl.
| | |
|---|---|
| E21B 33/138 | (2006.01) |
| C09K 8/035 | (2006.01) |
| C09K 8/62 | (2006.01) |
| C09K 8/70 | (2006.01) |
| C09K 8/92 | (2006.01) |
| C09K 8/42 | (2006.01) |
| C09K 8/72 | (2006.01) |

(52) U.S. Cl.
CPC ............. *C09K 8/035* (2013.01); *C09K 8/42* (2013.01); *C09K 8/62* (2013.01); *C09K 8/70* (2013.01); *C09K 8/72* (2013.01); *C09K 8/92* (2013.01); *E21B 33/138* (2013.01)

(58) Field of Classification Search
CPC ... C09K 8/42; C09K 8/70; C09K 8/72; C09K 8/95; E21B 33/138
USPC ........................................................ 166/292
See application file for complete search history.

(56) References Cited

U.S. PATENT DOCUMENTS

| | | | |
|---|---|---|---|
| 6,528,157 B1 * | 3/2003 | Hussain | C09K 8/805 428/325 |
| 8,415,432 B1 | 4/2013 | Mruk et al. | |
| 2004/0261996 A1 * | 12/2004 | Munoz, Jr. | C09K 8/516 166/279 |

(Continued)

OTHER PUBLICATIONS

International Search Report and Written Opinion issued in related PCT Application No. PCT/US2014/051462 dated Apr. 27, 2015, 10 pages.

(Continued)

*Primary Examiner* — Silvana C Runyan
(74) *Attorney, Agent, or Firm* — Craig Roddy; Baker Botts L.L.P.

(57) ABSTRACT

Diverting agent compositions comprising polymeric diverting agents and surface polymeric brushes, and methods of use in subterranean formations, are provided. In one embodiment, the diverting compositions comprise: a first component comprising polymeric particles; and a second component comprising polymeric particles having a plurality of surface polymeric brushes.

18 Claims, 5 Drawing Sheets

(56) References Cited

U.S. PATENT DOCUMENTS

| | | | |
|---|---|---|---|
| 2008/0093073 A1* | 4/2008 | Bustos | C09K 8/68 |
| | | | 166/279 |
| 2008/0196896 A1* | 8/2008 | Bustos | E21B 43/26 |
| | | | 166/281 |
| 2009/0258798 A1 | 10/2009 | Munoz et al. | |
| 2011/0240293 A1* | 10/2011 | Lesko | C09K 8/665 |
| | | | 166/280.1 |
| 2011/0303415 A1 | 12/2011 | Todd et al. | |
| 2014/0014348 A1 | 1/2014 | Mahoney et al. | |
| 2014/0116702 A1 | 5/2014 | Tang | |
| 2016/0237772 A1* | 8/2016 | Miller | C09K 8/40 |

OTHER PUBLICATIONS

Li, Guo Liang, Helmuth Möhwald, and Dmitry G. Shchukin. "Precipitation polymerization for fabrication of complex core-shell hybrid particles and hollow structures." Chemical Society Reviews 42.8 (2013): 3628-3646.

Cho, Eun Chul, Yang Deuk Kim, and Kilwon Cho. "Thermally responsive poly (N-isopropylacrylamide) monolayer on gold: synthesis, surface characterization, and protein interaction/adsorption studies." Polymer 45.10 (2004): 3195-3204.

International Preliminary Report on Patentability issued in related Application No. PCT/US2014/051462, dated Mar. 2, 2017 (7 pages).

\* cited by examiner

POLYMER BRUSHES IN DIVERTING AGENTS FOR USE IN SUBTERRANEAN FORMATIONS

CROSS-REFERENCE TO RELATED APPLICATION

The present application is a U.S. National Stage Application of International Application No. PCT/US2014/051462 filed Aug. 18, 2014, which is incorporated herein by reference in its entirety for all purposes.

BACKGROUND

The present disclosure relates to diverting agents and associated methods of use in subterranean treatments.

Diverting agents may be used in a variety of subterranean treatments. Such treatments include, but are not limited to, drilling, stimulation treatments (e.g., fracturing treatments, matrix acidizing treatments), and cementing operations. For example, after a well bore is drilled and completed in a subterranean producing zone, it is often necessary to introduce a treatment fluid into the zone. For example, a producing zone can be stimulated by introducing an aqueous acid solution into the matrix of a producing zone to dissolve formation material or materials near the wellbore which impede well productivity, and thereby increase its porosity and permeability. This results in an increase in the production of hydrocarbons therefrom. To insure that the producing zone is contacted by the treating fluid uniformly, a particulate solid diverting agent may be placed in the zone to direct the placement of a desired treatment fluid. One technique has been to pack the diverting agent in perforation tunnels extending from the well bore into the subterranean zone. The diverting agent in the perforation tunnels causes the treating fluid introduced therein to be uniformly distributed between all of the perforations whereby the subterranean zone is uniformly treated. The term "zone," as used herein, simply refers to a portion of the formation and does not imply a particular geological strata or composition.

Traditional diverting agents may be grouped into two classifications. Such classifications include viscous fluid diverting agents and physical/mechanical diverting agents. In the former, typically, a relatively high viscosity fluid flows into a subterranean zone, creating a resistance that causes subsequent treatment fluids to be diverted to other portions of the formation. Such diversion methods are considered relatively easy to implement, but are generally thought not to be as effective as diverting agents that introduce a physical or mechanical barrier. Additionally, high temperatures associated with wells of greater depth lead to increased instability of such viscosified fluids.

In some cases, conventional diverting agents may not completely block off or divert the fracturing fluid, which results in fluid loss or leak-off into the formation, especially at the first few seconds after the fluid is injected into the zone. This initial phase of high fluid loss is known as a "spurt." The spurt typically ends within a few seconds; however fluid loss in typically persists.

BRIEF DESCRIPTION OF THE FIGURES

These drawings illustrate certain aspects of some of the embodiments of the present disclosure, and should not be used to limit or define the disclosure.

Figure 1:
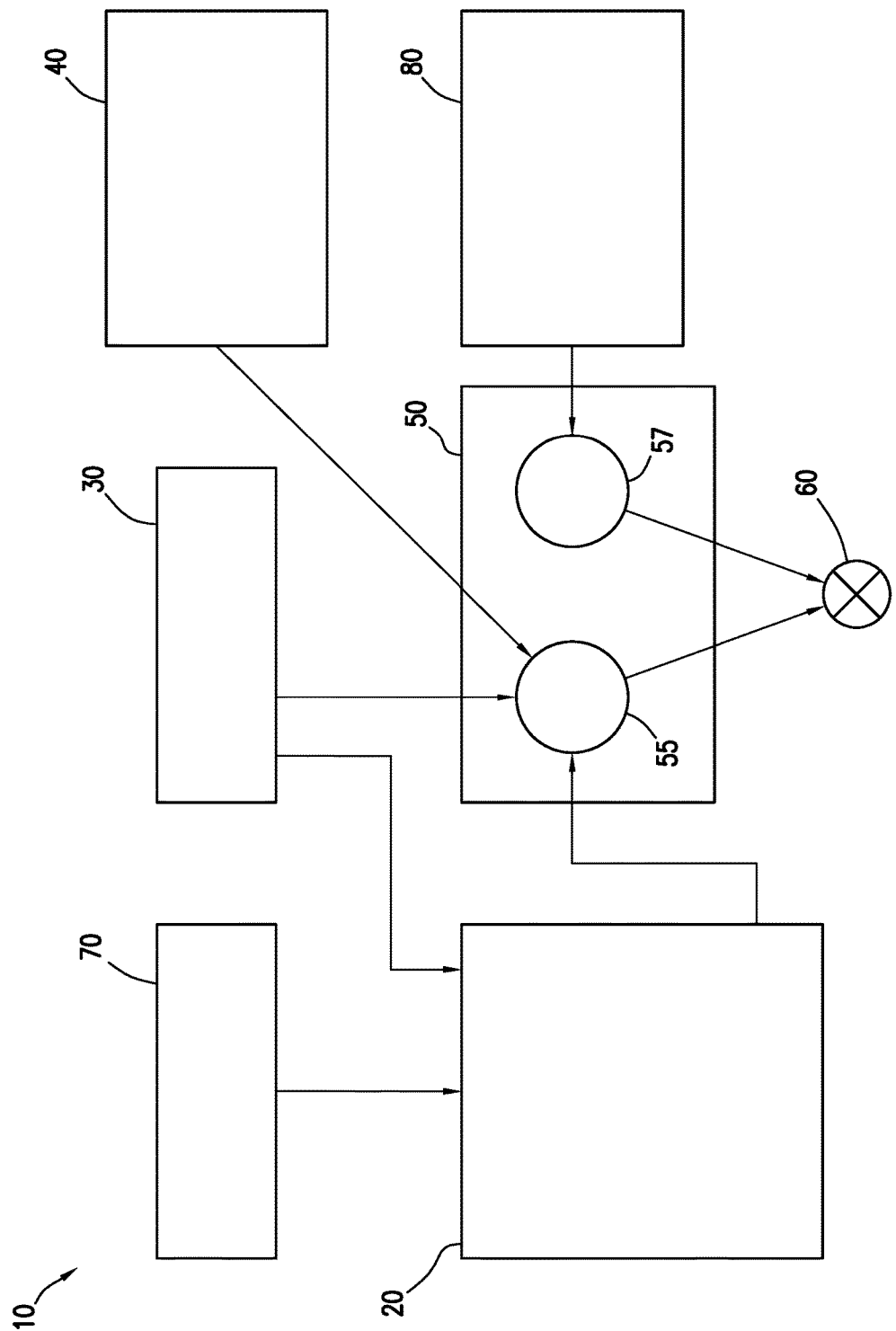
FIG. 1 is a diagram illustrating an example of a fracturing system that may be used in accordance with certain embodiments of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to diverting agents and associated methods of use in subterranean treatments. In particular, at least in some embodiments, the present disclosure relates to diverting agents (e.g., degradable diverting agents) that have been chemically modified to have surface polymer brushes, and their associated methods of use in subterranean formations.

More specifically, the present disclosure provides compositions and methods for hydrolytically degradable polymers that have been chemically modified to have surface polymer brushes (e.g., surface-decorated) for use in fluid loss and diverter applications. In certain embodiments, a composition comprising polymeric diverting agent and polymeric brushes is provided. In certain embodiments, the polymeric diverting agent comprises poly(lactic acid). As used here, the term "polymeric brush" refers to a polymer attached to a surface, typically at one end of the polymer. In certain embodiments, the polymer brushes can be derived from telechelic polymers or single end-group terminated polymers. In certain embodiments, the polymer comprises one or more azido groups. In other embodiments, the polymer comprises at least one azide-terminated functionality, and can be selected from the group consisting of polystyrene, poly(methyl acrylate), methoxypolyethylene glycol, and derivatives and combinations thereof. In other embodiments, the polymer comprises one or more thio groups. In other embodiments, the polymer comprises at least one thiol-terminated functionality, and can be selected from the group consisting of O-(2-mercaptoethyl)-O'-methylpolyethylene glycol, poly(N-isopropylacrylamide), and derivatives and combinations thereof. In certain embodiments, the polymeric brushes comprise a degradable polymer. In certain embodiments, the degradable polymer comprises at least one polymer selected from the group consisting of polyvinyl alcohol, polyvinyl acetate, poly (propylene oxide), poly(lactic acid), polysaccharides, chitin, chitosan, proteins, aliphatic polyesters, poly(glycolide); poly(ε-caprolactone); poly(hydroxybutyrate); poly(anhydrides); aliphatic polycarbonates; poly(ortho esters); poly (amino acids); poly(ethylene oxide); polyphosphazenes, polyanhydrides, amines, polyamines, and any derivatives and combinations thereof.

Figure 3:
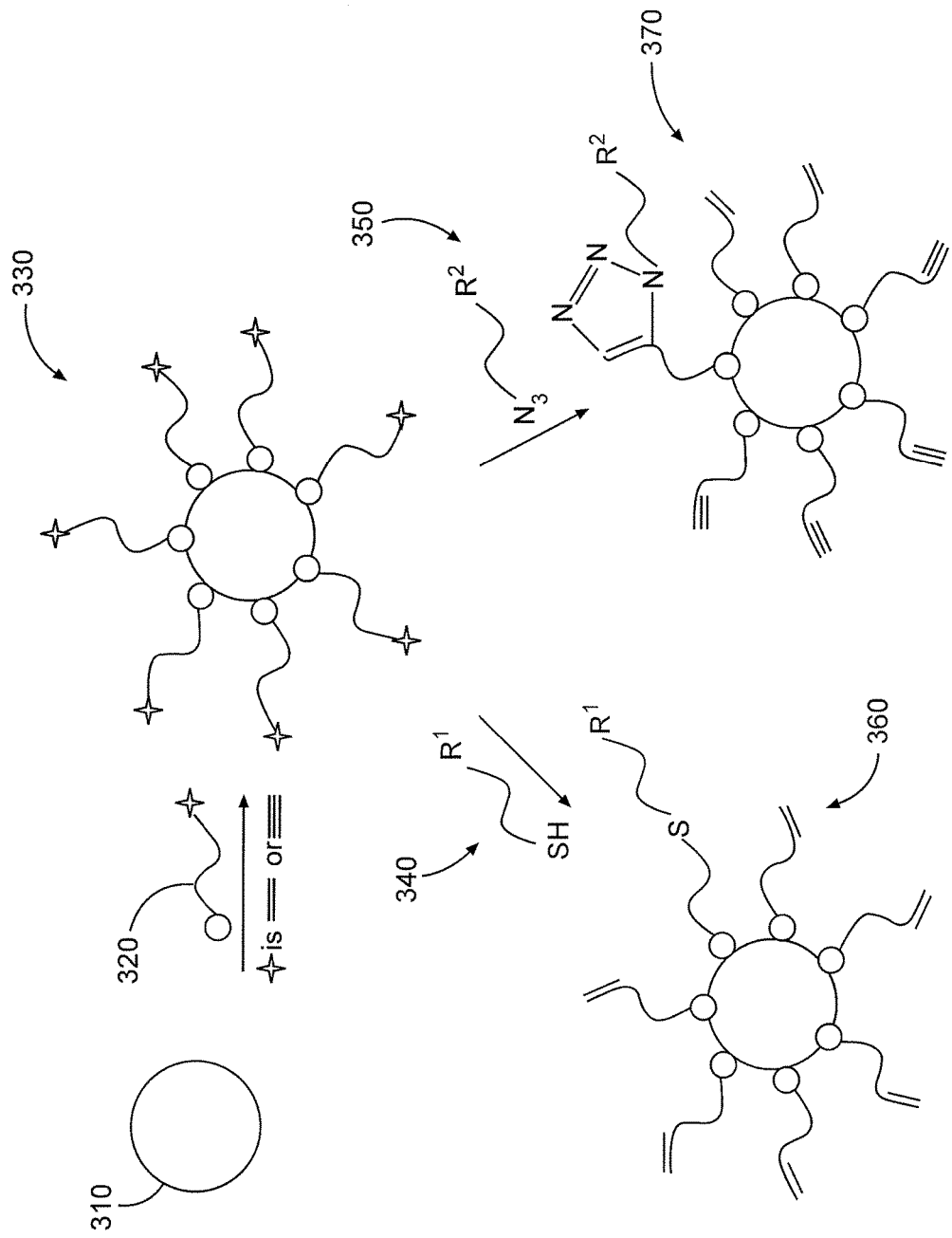
FIG. 3 is a diagram illustrating degradable diverting agents chemically modified to have surface polymer brushes in accordance with some aspects of the present disclosure.

FIG. 3 is a diagram illustrating degradable diverting agents chemically modified to have surface polymer brushes in accordance with some aspects of the present disclosure. Synthesizing chemically modified diverters can involve reacting functionalized surface particles (e.g., allyl or propargyl) 320 of diverting agent particles 310 (e.g., PLA) with end group terminated polymers 340, 350 to form surface polymer brushes 360, 370. The use of the polymer brushes may, among other benefits, enhance the diverting properties of the diverting agent.

Figure 4:
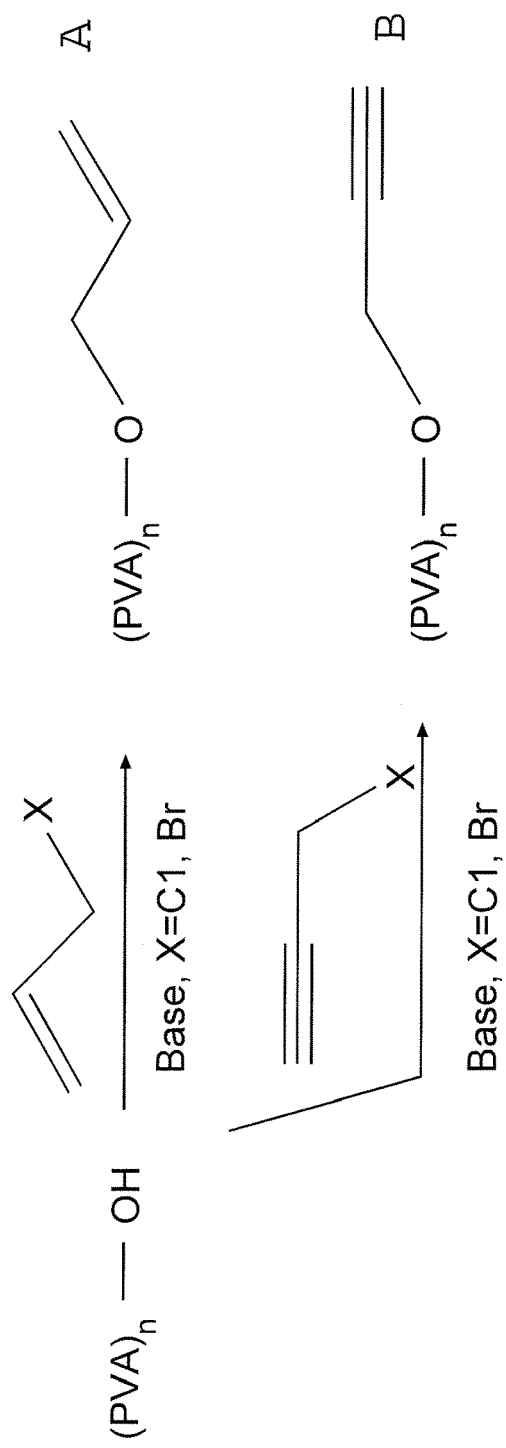
FIG. 4 is a diagram illustrating chemical reactions involved in preparation of polymer brushes in accordance with certain embodiments of the present disclosure.

FIG. 4 is a diagram illustrating chemical reactions involved in preparation of polymer brushes in accordance with certain embodiments of the present disclosure. In certain embodiments a degradable polymer such as polyvinyl alcohol (PVA) is reacted with allyl (reaction A) or propargyl (reaction B) halides under basic conditions to install double bond (as in reaction A) or triple bond (as in reaction B) functionalities.

Once double or triple bond functionalities are installed on the degradable polymer surface particles, e.g., as shown in FIG. 4, the derviatized particles can be further reacted with polymers as shown in FIG. 3. Polymers used in accordance with the present disclosure can include those terminating with azido (—$N_3$) groups or thio (—SH) groups. The thiol-terminated polymers 340 can include, e.g., O-(2-mercaptoethyl)-O'-methylpolyethylene glycol, poly(N-isopropylacrylamide), polystyrene, poly(methyl acrylate), methoxypolyethylene glycol, and derivatives and combinations thereof, and similar polymers. The azido-terminated polymers 350 can include, e.g., polystyrene, poly(methyl acrylate), methoxypolyethylene glycol, derivatives and combinations thereof, and similar polymers.

Figure 5:
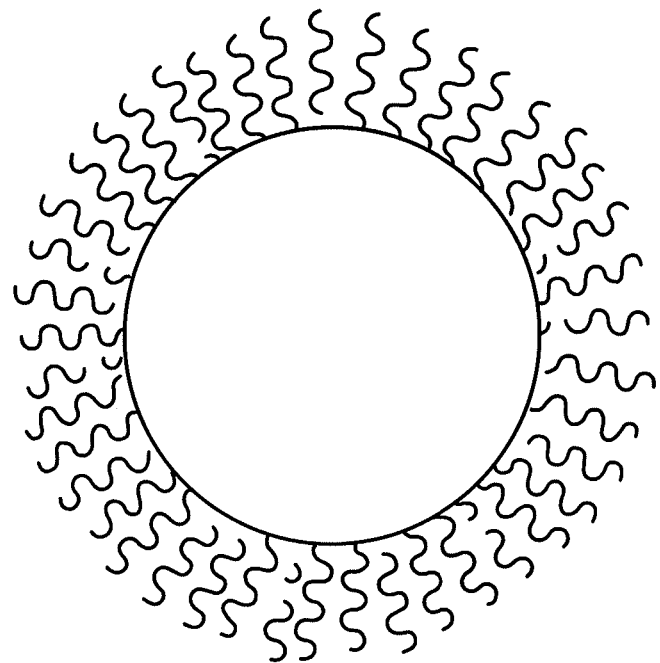
FIG. 5 is a diagram illustrating degradable diverting agents chemically modified to have surface polymer brushes in accordance with some aspects of the present disclosure.

Once the polymer brushes are formed as shown in FIGS. 3 and 4, a degradable polymer such as polylactide (PLA) can be added in amounts varying from about 1% to about 95% by volume in an appropriate solvent such as tetrahydrofuran or acetonitrile, the resulting solution stirred, and the solvent removed. FIG. 5 is a diagram illustrating the resulting degradable diverting agents chemically modified to have surface polymer brushes in accordance with some aspects of the present disclosure.

In certain embodiments, diverting agent with surface polymeric brushes can be combined with a conventional polymeric diverting agent. The crystallinity and/or particle size distribution of polymeric diverting agents such as PLA may affect the diverter's degradation time. For example, crystallinity of diverting agents can range from fully amorphous to very high crystallinity. In practice, a given diverting agent product is a mixture containing various percentages of amorphous and crystalline types. In general, the higher the ratio of crystalline to amorphous particles, the slower the degradation occurs, since it typically takes water molecules longer to break down a crystalline lattice as compared to a non-crystalline/amorphous structure. In certain embodiments, therefore, diverting compounds can be formulated that both have improved diverting properties (i.e., by the addition of polymeric brushes) and are customized for a particular well (e.g., pH, temperature) with respect to degradation time. In certain embodiments, the effectiveness of the diverting agents of the present disclosure in diverting fluids and/or reducing fluid loss may be enhanced by selectively providing polymeric brushes on polymeric particles having particle sizes in a certain range (e.g., in all or a portion of the diverting agent composition). The choice of particle sizes of polymeric particulate diverting agents that are appropriate for surface polymeric brushes of the present disclosure may vary depending on factors that a person of ordinary skill in the art would recognize with the benefit of this disclosure, including but not limited to the composition, permeability, and/or porosity of the subterranean formation in which they are used. For example, in certain embodiments, a diverting agent composition comprising smaller-sized (e.g., finer mesh) polymeric particles having surface polymeric brushes may provide better fluid loss control in subterranean formations exhibiting low fluid permeability as compared to conventional diverting agents of a similar particle size.

In certain embodiments, a method of treating a subterranean formation penetrated by a wellbore comprising the steps of providing (e.g., forming) a well treatment fluid comprising a base fluid and a polymeric diverting agent with surface polymeric brushes, and contacting the subterranean formation with the well treatment fluid is provided. In certain embodiments, the polymeric diverting agent with surface polymeric brushes may be deposited in at least a portion of the subterranean formation and may divert the flow of fluids away from that portion of the subterranean formation.

In certain embodiments, a method of treating a subterranean formation penetrated by a wellbore comprising the steps of providing (e.g., forming) a well treatment fluid comprising a base fluid, a polymeric diverting agent, and a plurality of polymeric brushes, and contacting the subterranean formation with the well treatment fluid. In certain embodiments, the polymeric diverting agent and plurality of polymeric brushes may be deposited in at least a portion of the subterranean formation and may divert the flow of fluids away from that portion of the subterranean formation.

The methods and compositions of the present disclosure may, among other things, reduce fluid loss, among other ways, by forming a comprehensive complex matrix network in the pore spaces of a subterranean formation, thereby preventing fluid leakoff therethrough. In certain embodiments, the complex matrix network of polymeric brushes also may hinder the interaction of a polymeric diverting agent with fluids in the formation, which may slow the hydrolysis of degradable polymeric diverting agents. In certain embodiments, the polymeric brushes of the present disclosure may be hydrophobic, which may provide for more effective diversion of aqueous fluids in a subterranean formation.

The polymeric diverting agent and the polymeric brushes may be used in respective amounts selected, among other purposes, to optimize the matrix network formed by those components to provide enhanced fluid loss control. In certain embodiments, the polymeric brushes may be provided in an amount of from about 5% to about 95% by volume of the polymeric diverting agent.

The fracturing fluids used in the methods and systems of the present disclosure may comprise any base fluid known in the art, including aqueous fluids, non-aqueous fluids, gases, or any combination thereof. Aqueous fluids that may be suitable for use in the methods and systems of the present disclosure may comprise water from any source, provided that it does not contain compounds that adversely affect other components of the fracturing fluid. Such aqueous fluids may comprise fresh water, salt water (e.g., water containing one or more salts dissolved therein), brine (e.g., saturated salt water), seawater, or any combination thereof. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of gelling agents, acids, and other additives included in the fluid. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, hydrocarbons, organic liquids, and the like. In certain embodiments, the fracturing fluids may comprise a mixture of one or more fluids and/or gases, including but not limited to emulsions, foams, and the like.

The diverting agents used in the methods and systems of the present disclosure may comprise any particulate material capable of altering some or all of the flow of a substance away from a particular portion of a subterranean formation to another portion of the subterranean formation or, at least in part, ensure substantially uniform injection of a treatment fluid (e.g., a fracturing fluid) over the region of the subterranean formation to be treated. Diverting agents may, for example, selectively enter more permeable zones of a subterranean formation, where they may create a relatively impermeable barrier across the more permeable zones of the formation (including by bridging one or more fractures), thus serving to divert a subsequently introduced fracturing fluid into the less permeable portions of the formation. Examples of particulate diverting materials that may be suitable for use in certain embodiments of the present disclosure may include, but are not limited to, naphthalene, clean tar, starch, moth balls, naphthalinic flakes, wax beads, boric oxide; derivatives of the foregoing; and combinations of any of the foregoing. In certain embodiments, the particulate diverting agents used in the methods and systems of the present disclosure may serve a dual purpose as both a proppant particulate (i.e., preventing fractures from fully closing upon the release of the hydraulic pressure, forming conductive channels through which fluids may flow to a well bore) and as a diverting agent. Such dual-purpose particulates may be referred to herein as "self-diverting" proppants.

In certain embodiments, a diverting agent's diverting effects may be temporary. For example, a degradable and/or soluble diverting agent may be used such that it degrades or dissolves, for example, after a period of time in the subterranean formation or when contacted by a particular fluid or fluids. Examples of degradable diverting agents that may be suitable for use in certain embodiments of the present disclosure include, but are not limited to, fatty alcohols, fatty acid salts, fatty esters, proteinous materials, degradable polymers, and the like. Suitable examples of degradable polymers that may be used in accordance with the present disclosure include, but are not limited to, homopolymers, random, block, graft, and star- and hyper-branched polymers. Specific examples of suitable polymers include polysaccharides such as dextran or cellulose; chitin; chitosan; proteins; aliphatic polyesters; poly(lactide); poly(glycolide); poly(s-caprolactone); poly(hydroxybutyrate); poly(anhydrides); aliphatic polycarbonates; poly(acrylamide); poly(ortho esters); poly(amino acids); poly(ethylene oxide); and polyphosphazenes. Polyanhydrides are another type of degradable polymers that may be suitable for use as degradable diverting agents in the present disclosure. Examples of polyanhydrides that may be suitable include poly(adipic anhydride), poly(suberic anhydride), poly(sebacic anhydride), and poly(dodecanedioic anhydride). Other suitable examples include but are not limited to poly(maleic anhydride) and poly(benzoic anhydride).

Diverting agents may be introduced into the subterranean formation in a fracturing fluid, and may be included in fracturing fluids in any suitable concentration. In certain embodiments, the diverting agents may be provided at the well site in a slurry that is mixed into the base fluid of the fracturing fluid as the fluid is pumped into a well bore. In certain embodiments, the concentration of diverting agent in the fracturing fluid may range from about 0.01 lbs per gallon to about 1 lbs per gallon. In certain embodiments, the concentration of diverting agent in the fracturing fluid may range from about 0.1 lbs per gallon to about 0.3 lbs per gallon. In certain embodiments, the total amount of diverting agent used for a particular stage of a fracturing operation may range from about 1000 lbs to about 5000 lbs. A person of skill in the art with the benefit of this disclosure will recognize the appropriate amount of diverting agent to use in an application of the present disclosure based on, among other things, the type of formation, the particle size of the diverting agent, the parameters of the fracturing operation, the desired fracture geometries, and the like.

In certain embodiments, the fracturing fluids used in the methods and systems of the present disclosure optionally may comprise one or more gelling agents, which may comprise any substance that is capable of increasing the viscosity of a fluid, for example, by forming a gel. In certain embodiments, the gelling agent may viscosify an aqueous fluid when it is hydrated and present at a sufficient concentration. Examples of gelling agents that may be suitable for use in accordance with the present disclosure include, but are not limited to guar, guar derivatives (e.g., hydroxyethyl guar, hydroxypropyl guar, carboxymethyl guar, carboxymethylhydroxyethyl guar, and carboxymethylhydroxypropyl guar ("CMHPG")), cellulose, cellulose derivatives (e.g., hydroxyethyl cellulose, carboxyethylcellulose, carboxymethylcellulose, and carboxymethylhydroxyethylcellulose), biopolymers (e.g., xanthan, scleroglucan, diutan, etc.), starches, chitosans, clays, polyvinyl alcohols, acrylamides, acrylates, viscoelastic surfactants (e.g., methyl ester sulfonates, hydrolyzed keratin, sulfosuccinates, taurates, amine oxides, ethoxylated amides, alkoxylated fatty acids, alkoxylated alcohols, ethoxylated fatty amines, ethoxylated alkyl amines, betaines, modified betaines, alkylamidobetaines, etc.), combinations thereof, and derivatives thereof. The term "derivative" is defined herein to include any compound that is made from one of the listed compounds, for example, by replacing one atom in the listed compound with another atom or group of atoms, rearranging two or more atoms in the listed compound, ionizing the listed compounds, or creating a salt of the listed compound. In certain embodiments, the gelling agent may be "crosslinked" with a crosslinking agent, among other reasons, to impart enhanced viscosity and/or suspension properties to the fluid. The gelling agent may be included in any concentration sufficient to impart the desired viscosity and/or suspension properties to the aqueous fluid. In certain embodiments, the gelling agent may be included in an amount of from about 0.1% to about 10% by weight of the aqueous fluid. In other exemplary embodiments, the gelling agent may be present in the range of from about 0.1% to about 2% by weight of the aqueous fluid.

In certain embodiments, the fracturing fluids used in the methods and systems of the present disclosure optionally may comprise any number of additional additives, among other reasons, to enhance and/or impart additional properties of the composition. For example, the compositions of the present disclosure optionally may comprise one or more salts, among other reasons, to act as a clay stabilizer and/or enhance the density of the composition, which may facilitate its incorporation into a fracturing fluid. In certain embodiments, the compositions of the present disclosure optionally may comprise one or more dispersants, among other reasons, to prevent flocculation and/or agglomeration of the solids while suspended in a slurry. Other examples of such additional additives include, but are not limited to, salts, surfactants, acids, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), and the like. A person skilled in the art, with the benefit of this disclosure, will recognize the types of additives that may be included in the fluids of the present disclosure for a particular application.

In an additional embodiment, the degradable diverting agents of the present disclosure may be used in conjunction with conventional diverting materials. Non-limiting examples of degradable diverting material that may be used in conjunction with the methods of the present disclosure may include, but are not limited to, degradable polymers. One suitable commercially available lightweight diverting material is a product known as "BIOVERT®," which is available from Halliburton Energy Services, Inc. Other suitable diverting materials may include, but are not limited to, rock salt, naphthalene, clean tar, starch, and moth balls.

The methods and systems of the present disclosure may be used during or in conjunction with any subterranean fracturing operation. For example, a fracturing fluid may be introduced into the formation at or above a pressure sufficient to create or enhance one or more fractures in at least a portion of the subterranean formation. Such fractures may be "enhanced" where a pre-existing fracture (e.g., naturally occurring or otherwise previously formed) is enlarged or lengthened by the fracturing treatment. Other suitable subterranean operations in which the methods and/or compositions of the present disclosure may be used include, but are not limited to, fracture acidizing, "frac-pack" treatments, and the like.

The fracturing fluids used in the methods and systems of the present disclosure may be prepared using any suitable method and/or equipment (e.g., blenders, stirrers, etc.) known in the art at any time prior to their use. In some embodiments, the fracturing fluids may be prepared at a well site or at an offsite location. In certain embodiments, an aqueous fluid may be mixed the gelling agent first, among other reasons, in order to allow the gelling agent to hydrate and form a gel. Once the gel is formed, proppants and/or diverting agents may be mixed into the gelled fluid. Once prepared, a fracturing fluid of the present disclosure may be placed in a tank, bin, or other container for storage and/or transport to the site where it is to be used. In other embodiments, a fracturing fluid of the present disclosure may be prepared on-site, for example, using continuous mixing or "on-the-fly" methods, as described below.

In certain embodiments of the methods and systems of the present disclosure, one or more additional fluids may be introduced into the well bore before, after, and/or concurrently with the fracturing fluid, for any number of purposes or treatments in the course of a fracturing operation. Examples of such fluids include, but are not limited to, preflush fluids, pad fluids, pre-pad fluids, acids, afterflush fluids, cleaning fluids, and the like. For example, a pad fluid may be pumped into the well bore prior to the alternating stages of proppant-carrying fracturing fluid and clean fracturing fluid. In certain embodiments, another volume of pad fluid may be pumped into the well bore after the diverting agent(s) are introduced into the formation, among other reasons, to initiate the creation of new fractures in the area of the formation to which the diverting agent diverts fluid. A person of skill in the art with the benefit of this disclosure will recognize the appropriate types of additional fluids to use, and when they may be used, in the methods and systems of the present disclosure.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, a diverter source 80, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include proppant for combination with the fracturing fluid. The proppant source 40 may be equipped with appropriate metering devices (e.g., valves or and/or other similar mechanisms) that are capable of controlling whether or not proppant is dispensed (and the amount of proppant dispensed) into a first blender 55 in the pump and blender system 50 at different points in time during the fracturing job. The proppant source 40 also may include metering devices or other equipment capable of dispensing proppant in pulses or intervals so as to create alternating intervals of proppant-carrying fluid and "clean" fluid that are introduced into well 60. The diverter source 80 can include one or more diverting agents for combination with the fracturing fluid. The diverter source 80 may be equipped with appropriate metering devices (e.g., valves or and/or other similar mechanisms) that are capable of controlling whether or not diverting agents are dispensed (and the amount of diverting agents dispensed) into a second blender 57 in the pump and blender system 50 at different points in time during the fracturing job. For example, diverter source 80 and blender 57 may be capable of introducing diverting agent into the well 60 without using or interrupting the operation of proppant source 40 and blender 55, such that diverting agent may be introduced into well 60 separately while proppant from the proppant source 40 is introduced into the well bore at substantially the same time. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40, diverting agents from the diverter source 80, and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, proppant source 40, and/or diverter source 80 may be equipped with one or more metering devices (not shown) to control the flow of fluids, proppants, diverting agents, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide "clean" fracturing fluid into the well during certain stages, proppants during other stages, and combinations of those components at yet other stages.

Figure 2:
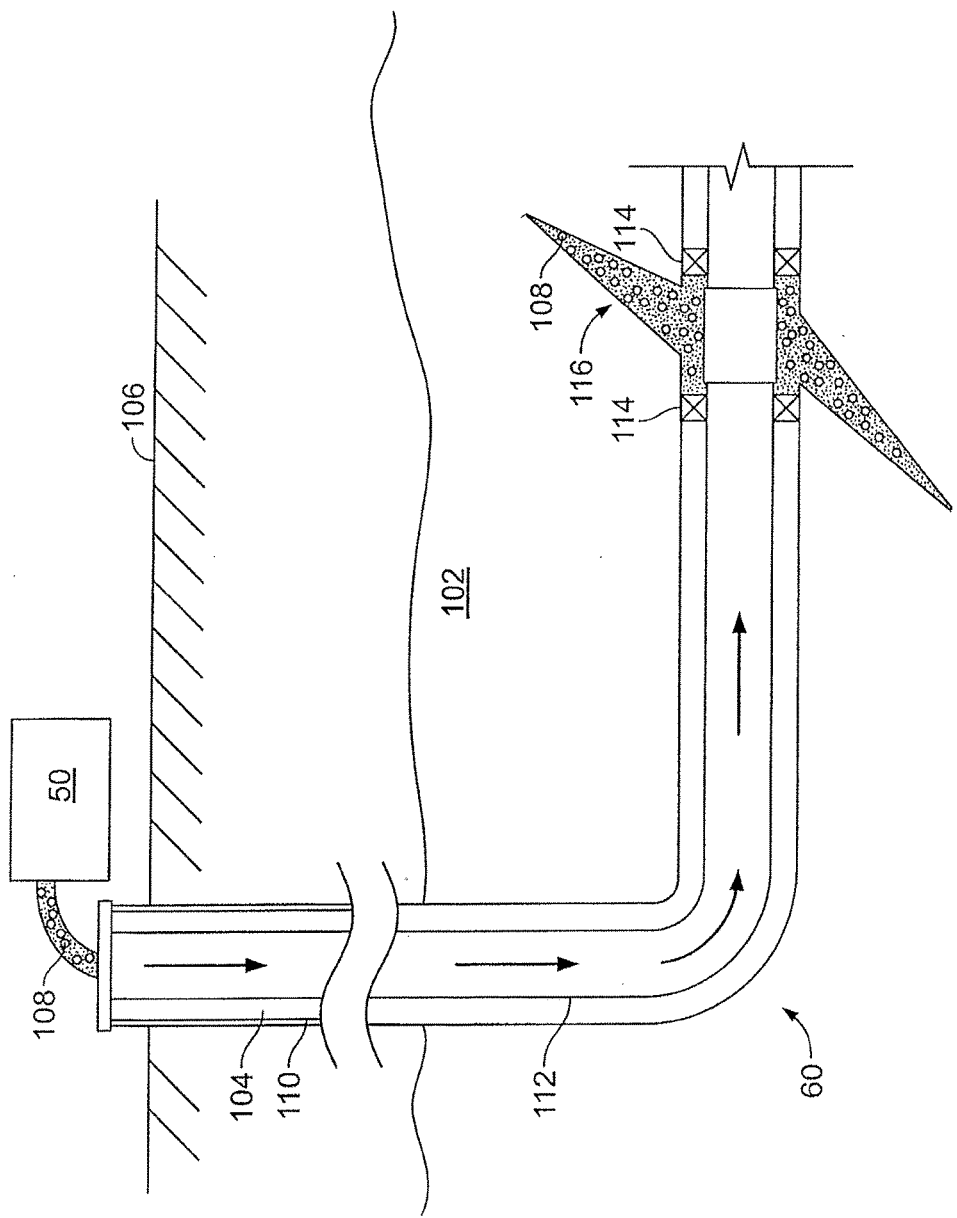
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

An embodiment of the present disclosure is diverting composition comprising: a first component comprising polymeric particles; and a second component comprising polymeric particles having a plurality of surface polymeric brushes.

Another embodiment of the present disclosure is a method comprising: providing a well treatment fluid comprising a base fluid and a diverting agent comprising a plurality of polymeric particulates having a plurality of surface polymeric brushes; and contacting at least a portion of a subterranean formation with the well treatment fluid.

Another embodiment of the present disclosure is a method comprising: providing a well treatment fluid comprising a base fluid, and a diverting agent that comprises (i) a first component comprising polymeric particles having no surface polymeric brushes, and (ii) a second component comprising polymeric particles having a plurality of surface polymeric brushes; and contacting at least a portion of the subterranean formation with the well treatment fluid.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   providing a well treatment fluid comprising a base fluid and a diverting agent, wherein the diverting agent comprises:
   a plurality of polymeric particulates, and
   a plurality of surface polymeric brushes that each have at least a first end attached to a surface of at least one of the polymeric particulates and a second end comprising a functional end group; and
   contacting at least a portion of a subterranean formation with the well treatment fluid.

2. The method of claim 1 wherein at least a portion of the polymeric particles of the diverting agent comprises poly(lactic acid).

3. The method of claim 1 wherein the polymeric brushes comprise a degradable polymer that comprises at least one polymer selected from the group consisting of: polyvinyl alcohol; polyvinyl acetate; poly(propylene oxide); poly(lactic acid); a polysaccharide, a chitin; a chitosan; a protein; an aliphatic polyester; a poly(glycolide); a poly(ε-caprolactone); a poly(hydroxybutyrate); a poly(anhydride); an aliphatic polycarbonate; a poly(ortho ester); a poly(amino acid); a poly(ethylene oxide); a polyphosphazene; a polyanhydride; any derivative thereof; and any combination thereof.

4. The method of claim 1 further comprising introducing the well treatment fluid into a well bore penetrating at least a portion of the subterranean formation using a pump and blender system.

5. The method of claim 1 wherein at least a portion of the diverting agent is deposited in at least a portion of the subterranean formation.

6. The method of claim 5 wherein the diverting agent diverts the flow of fluids away from the portion of the subterranean formation.

7. The method of claim 1 wherein the polymeric brushes comprise an azido end group.

8. The method of claim 1 wherein the polymeric brushes comprise at least one polymer selected from the group consisting of polystyrene, poly(methyl acrylate), methoxypolyethylene glycol, any derivative thereof, and any combination thereof.

9. The method of claim 1 wherein the polymeric brushes comprise a thio end group.

10. The method of claim 1 wherein at least a portion of the polymeric particles of the diverting agent comprises a degradable polymer.

11. A method comprising:
    providing a well treatment fluid comprising
    a base fluid, and
    a diverting agent that comprises
    (i) a first component comprising polymeric particles having no surface polymeric brushes, and
    (ii) a second component comprising:
    (a) polymeric particles; and
    (b) a plurality of surface polymeric brushes that each have at least a first end attached to a surface of at least one of the polymeric particles and a second end comprising a functional end group; and
    contacting at least a portion of the subterranean formation with the well treatment fluid.

12. The method of claim 11 wherein at least a portion of the polymeric particles of at least one of the first and second components comprises poly(lactic acid).

13. The method of claim 11 wherein the polymeric brushes comprise a degradable polymer that comprises at least one polymer selected from the group consisting of: polyvinyl alcohol; polyvinyl acetate; poly(propylene oxide); poly(lactic acid); a polysaccharide, a chitin; a chitosan; a protein; an aliphatic polyester; a poly(glycolide); a poly(ε-caprolactone); a poly(hydroxybutyrate); a poly(anhydride); an aliphatic polycarbonate; a poly(ortho ester); a poly(amino acid); a poly(ethylene oxide); a polyphosphazene; a polyanhydride; any derivative thereof; and any combination thereof.

14. The method of claim 11 wherein at least a portion of the diverting agent is deposited in at least a portion of the subterranean formation, and the well treatment fluid diverts the flow of fluids away from the portion of the subterranean formation.

15. The method of claim 11 wherein the polymeric brushes comprise an azido end group.

16. The method of claim 11 wherein the polymeric brushes comprise at least one polymer selected from the group consisting of polystyrene, poly(methyl acrylate), methoxypolyethylene glycol, any derivative thereof, and any combination thereof.

17. The method of claim 11 wherein the polymeric brushes comprise a thio end group.

18. The method of claim 11 wherein at least a portion of the polymeric particles of at least one of the first and second components comprises a degradable polymer.

* * * * *